(12) United States Patent
Rhee et al.

(10) Patent No.: US 10,505,962 B2
(45) Date of Patent: Dec. 10, 2019

(54) BLACKBOX PROGRAM PRIVILEGE FLOW ANALYSIS WITH INFERRED PROGRAM BEHAVIOR CONTEXT

(71) Applicant: NEC Laboratories America, Inc., Princeton, NJ (US)

(72) Inventors: Junghwan Rhee, Princeton, NJ (US); Yuseok Jeon, West Lafayette, IN (US); Zhichun Li, Princeton, NJ (US); Kangkook Jee, Princeton, NJ (US); Zhenyu Wu, Plainsboro, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 219 days.

(21) Appl. No.: 15/623,538

(22) Filed: Jun. 15, 2017

(65) Prior Publication Data

US 2018/0054445 A1 Feb. 22, 2018

Related U.S. Application Data

(60) Provisional application No. 62/375,582, filed on Aug. 16, 2016.

(51) Int. Cl.
*H04L 29/06* (2006.01)
*G06F 21/60* (2013.01)
*G06F 21/55* (2013.01)

(52) U.S. Cl.
CPC .......... *H04L 63/1425* (2013.01); *G06F 21/55* (2013.01); *G06F 21/606* (2013.01); *G06F 2221/2141* (2013.01); *G06F 2221/2145* (2013.01); *H04L 63/1433* (2013.01)

(58) Field of Classification Search
CPC .................................................. H04L 63/1425
See application file for complete search history.

(56) References Cited

U.S. PATENT DOCUMENTS

| 5,043,878 | A | 8/1991 | Ooi | |
|---|---|---|---|---|
| 6,308,274 | B1* | 10/2001 | Swift | G06F 21/604 |
| | | | | 710/200 |
| 8,407,080 | B2* | 3/2013 | Jayaraman | G06Q 10/06393 |
| | | | | 705/7.39 |
| 8,621,647 | B1 | 12/2013 | Tinnes et al. | |
| 8,910,293 | B2* | 12/2014 | Pistoia | G06F 21/563 |
| | | | | 713/187 |
| 8,948,499 | B1* | 2/2015 | Medasani | G06K 9/00771 |
| | | | | 382/155 |
| 9,171,157 | B2* | 10/2015 | Flores | G06F 21/55 |
| 2003/0200462 | A1* | 10/2003 | Munson | G06F 11/3612 |
| | | | | 726/26 |
| 2006/0041940 | A1* | 2/2006 | Fang | G06F 21/554 |
| | | | | 726/22 |

(Continued)

*Primary Examiner* — Ali Shayanfar
(74) *Attorney, Agent, or Firm* — Joseph Kolodka

(57) ABSTRACT

A computer-implemented method for performing privilege flow analysis is presented. The computer-implemented method includes monitoring at least one program operating system (OS) event handled by a program, generating a privilege flow graph, determining an inferred program behavior context, and generating, based on a combination of the privilege flow graph and the inferred program behavior context, an inferred behavior context-aware privilege flow graph to distinguish different roles of processes and/or threads within the program.

1 Claim, 8 Drawing Sheets

(56) References Cited

U.S. PATENT DOCUMENTS

| | | | |
|---|---|---|---|
| 2007/0083912 A1* | 4/2007 | Lambert | G06F 21/6218 |
| | | | 726/3 |
| 2014/0282501 A1* | 9/2014 | Zeng | G06F 9/45545 |
| | | | 718/1 |
| 2016/0021174 A1* | 1/2016 | De Los Santos Vilchez | |
| | | | H04L 43/10 |
| | | | 709/201 |
| 2016/0057159 A1* | 2/2016 | Yin | H04L 63/145 |
| | | | 726/23 |
| 2017/0295193 A1* | 10/2017 | Yang | H04L 63/1425 |
| 2018/0173645 A1* | 6/2018 | Parker | G06F 9/455 |

* cited by examiner

US 10,505,962 B2

BLACKBOX PROGRAM PRIVILEGE FLOW ANALYSIS WITH INFERRED PROGRAM BEHAVIOR CONTEXT

RELATED APPLICATION INFORMATION

This application claims priority to Provisional Application No. 62/375,582, filed on Aug. 16, 2016, incorporated herein by reference in its entirety.

BACKGROUND

Technical Field

The present invention relates to computer software and, more particularly, to a privilege flow analysis with inferred program behavior context.

Description of the Related Art

A privilege escalation (PE) attack refers to a type of computer-based attack in which an attacker attempts to exploit inadequate or nonexistent controls to gain access to resources of a computer software application that are intended for access only by valid users having privileged rights, or that are intended for access by valid users having even non-privileged rights but that are meant to be off-limits to the attacker. It would be advantageous to check computer software applications to determine whether they are vulnerable to PE attacks and to provide methods for preventing such PE attacks.

SUMMARY

A computer-implemented method for performing privilege flow analysis is presented. The method includes monitoring at least one program operating system (OS) event handled by a program, generating a privilege flow graph, determining an inferred program behavior context, and generating, based on a combination of the privilege flow graph and the inferred program behavior context, an inferred behavior context-aware privilege flow graph to distinguish different roles of processes and/or threads within the program.

A system for performing privilege flow analysis is presented. The system includes a memory and a processor in communication with the memory, wherein the processor is configured to monitor at least one program operating system (OS) event handled by a program, generate a privilege flow graph, determine an inferred program behavior context, and generate, based on a combination of the privilege flow graph and the inferred program behavior context, an inferred behavior context-aware privilege flow graph to distinguish different roles of processes and/or threads within the program.

A non-transitory computer-readable storage medium including a computer-readable program for performing privilege flow analysis is presented, wherein the computer-readable program when executed on a computer causes the computer to perform the steps of monitoring at least one program operating system (OS) event handled by a program, generating a privilege flow graph, determining an inferred program behavior context, and generating, based on a combination of the privilege flow graph and the inferred program behavior context, an inferred behavior context-aware privilege flow graph to distinguish different roles of processes and/or threads within the program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
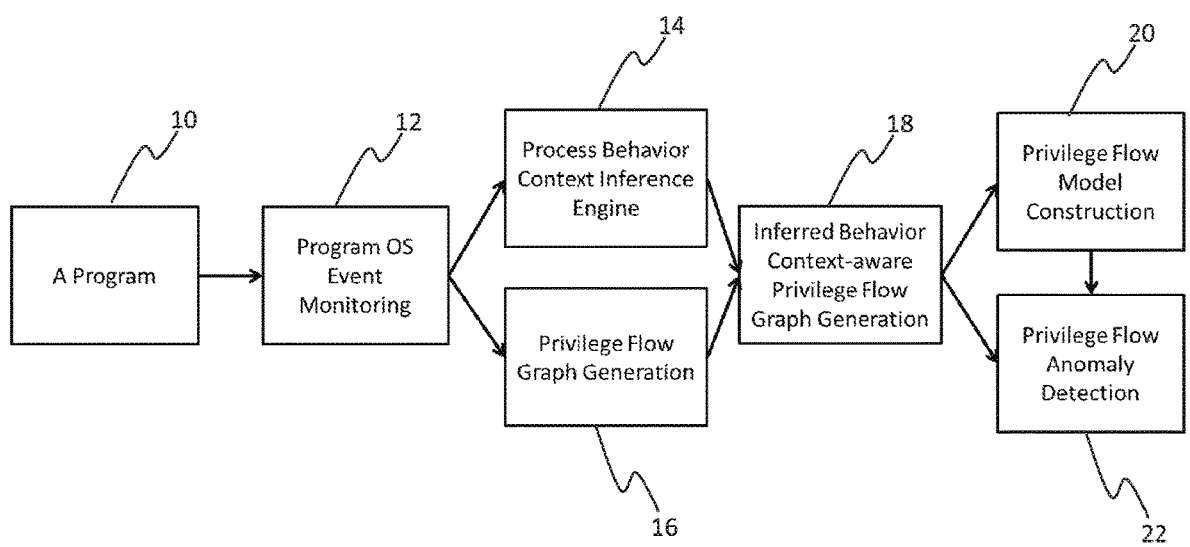
FIG. 1 is a block/flow diagram of an architecture for privilege flow analysis with inferred program behavior context, in accordance with embodiments of the present invention.

A great percentage of operating systems that are used today have user account privileges. These privileges may be for security reasons to make sure that someone does not leak internal company information out, or to protect the well-being of a computer from some persons incompetence with the computer, or to prevent a grave mistake from crashing the computer, or to stop system failure or hacking of a computer (internally or externally) through an account with restricted access to files. A privilege is defined as the delegation of authority over a computer system. A privilege allows a user to perform an action. Examples of various privileges include an ability to create a file in a directory, or to read or delete a file, access a device, or have read or write permission to a socket for communicating over the Internet. Users who have been delegated extra levels of control are called privileged. Users who lack most privileges are defined as unprivileged, regular, or normal users. Privileges can either be automatic, granted, or applied for.

Many programs use multiple processes and threads which can have different roles in a program. For example, in a webserver, one process works as a workload distributor while there are a dynamic set of processes as workers. Knowing such different process roles is useful because their process behavior can be significantly different depending on their roles and any anomaly detection based on privileges should be aware of it. Understanding the privilege behavior with different roles of program processes and/or threads is useful in preventing, e.g., privilege escalation. Privilege escalation is the act of exploiting a bug, design flaw or configuration oversight in an operating system or software application to gain elevated access to resources that are normally protected from an application or user. The result is that an application with more privileges than intended by the application developer or system administrator can perform unauthorized actions.

The exemplary embodiments of the present invention propose two modeling schemes to overcome such issues. First, a Privilege Flow Graph (PFG) is provided, which is a state transition diagram of a program's privileges in terms of multiple operating system (OS) data fields related to the privileges. The PFG summarizes the transitions of the privileges that the program often repeats. Second, an inferred program behavior context (IC) is presented, which is an inferred identity of a program process and/or thread based on behavior patterns to distinguish different behavior characteristics and roles within a program. A program hierarchy level and system call characteristics are used to distinguish different roles of program processes and/or threads. Based on these two models, a program's privilege flow graph is generated or created, which is specialized or customized for each inferred program behavior context. Therefore, at runtime, if the program shows privilege behavior outside of the generated privilege flow model, it is detected or labeled as an anomaly.

In accordance with the exemplary embodiments of the present invention, a privilege transition is a behavior that needs monitoring to detect undesired program behavior such as, but not limited to, privilege escalation. However, inside a program, there could be multiple processes and/or threads which have different transitions of privileges. This aspect is considered by the present invention. The present invention provides the advantage that it introduces a mechanism to distinguish programs' different roles and corresponding behaviors. The present invention further provides improved accuracy in anomaly detection based on programs' privilege changes.

FIG. 1 is a block/flow diagram of an architecture for privilege flow analysis with inferred program behavior context, in accordance with embodiments of the present invention.

In FIG. 1, given an executed program 10, operating system (OS) events handled by the program 10 are monitored by event monitoring module 12. These events include various behavior events for the process behavior context inference engine/module 14, and particular privilege change events for the privilege flow graph generation module 16. For each process and/or thread, its behavior context is inferred based on the modeling of OS events performed by the module 14. The privilege transitions for each process are modeled with a privilege flow graph performed by the module 16. Based on the information from the modules 14, 16, the privilege flow graph for a distinct inferred behavior context is created by inferred behavior context-aware privilege flow graph generation module 18.

This privilege model based on inferred process behavior context is used for anomaly detection. Specifically, it is performed in two steps. First, this model is constructed in the period of normal states of the program (e.g., in a controlled environment without any attack) performed by privilege flow model construction module 20. Second, after the program is deployed and used in production, the privilege model is constructed on the fly and compared with a model in the normal states. If any difference between two models is discovered, it is determined as an anomaly by the privilege flow anomaly detection module 22.

Figure 2:
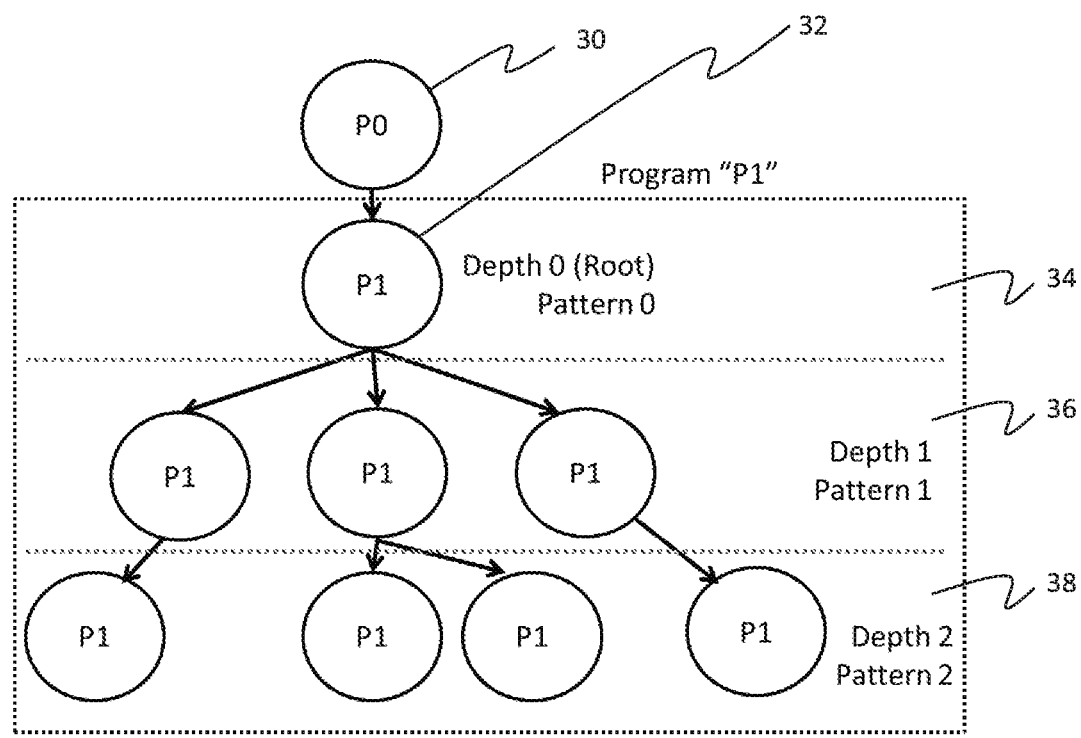
FIG. 2 is a block/flow diagram of a process and/or thread hierarchy within a single program instance, in accordance with embodiments of the present invention.

FIG. 2 is a block/flow diagram of a process and/or thread hierarchy within a single program instance, in accordance with embodiments of the present invention.

An inferred program behavior context (IC) is defined as an inferred identity of a program process and/or thread based on their behavior patterns to distinguish their different behavior characteristics and roles within a program. This component determines IC based on two pieces of information.

The first piece of information used to infer IC is the process and/or thread hierarchy within a program instance. FIG. 2 illustrates this concept. Each circle represents a process or a thread and an arrow indicates a creation of a process or a thread. The set of processes and threads of a program instance share the same executable path, a program image, and a program start time.

FIG. 2 starts from a P0 process 30, which invokes the first P1 process 32. This is the first (Root) process in the P1 program instance and its depth 34 in the hierarchy is zero (Pattern 0). From this process, the depth of a process and/or thread in the program is determined as a relative distance to a root node. The direct children processes of the root process have a first depth 36 or depth 1 (Pattern 1) and the grandchildren nodes of the root process have a second depth 38 or depth 2, which represents Pattern 2.

Figure 3:
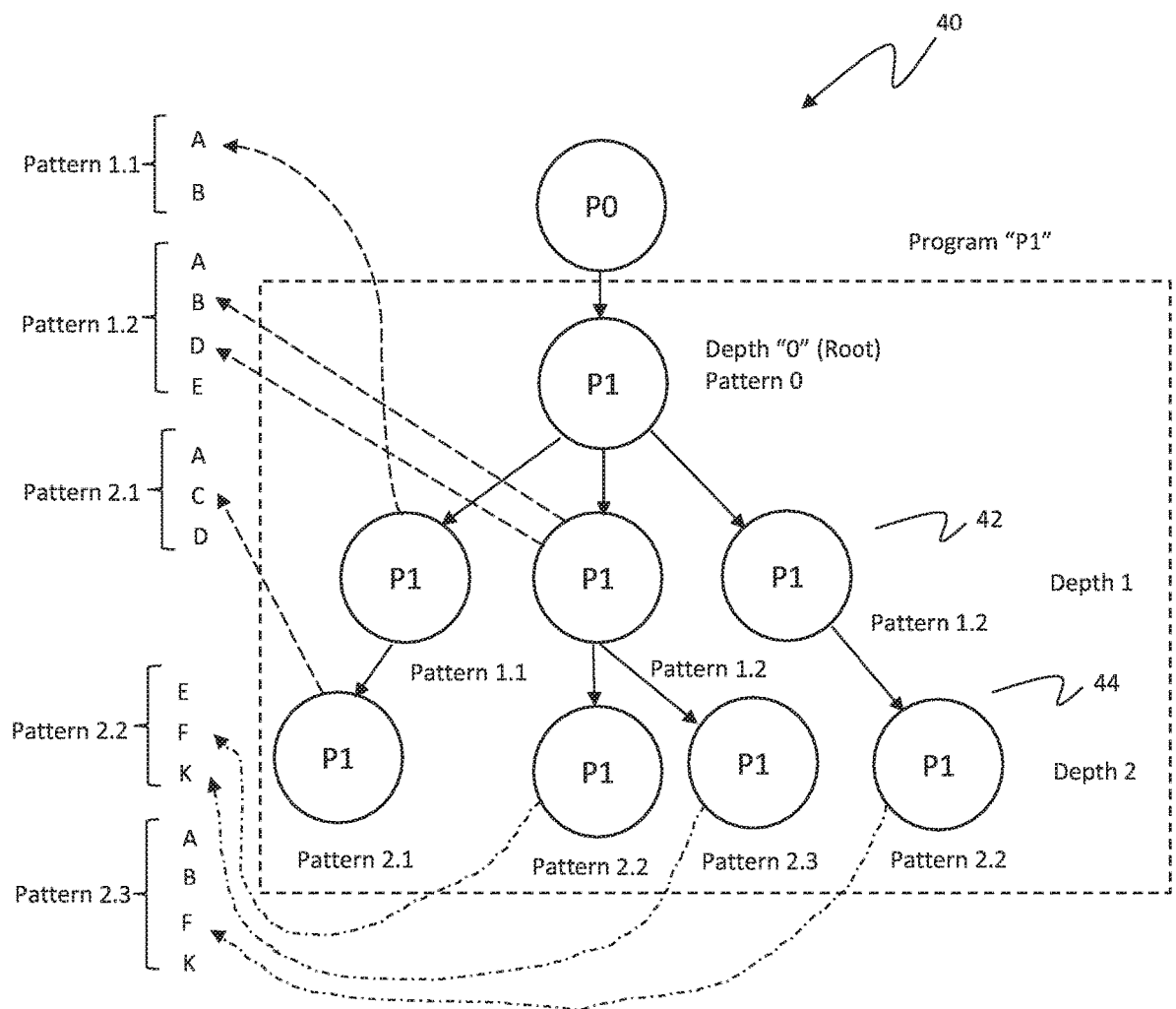
FIG. 3 is a block/flow diagram of a process and/or thread hierarchy annotated with operating system (OS) event characteristics within a single program instance, in accordance with embodiments of the present invention.

FIG. 3 is a block/flow diagram of a process and/or thread hierarchy 40 annotated with operating system (OS) event characteristics within a single program instance, in accordance with embodiments of the present invention.

In addition to the depth of a process and/or thread in a program instance, OS event characteristics are used to further differentiate or distinguish the processes having different roles while they share the same depth. For example, in FIG. 3, there are three processes 42 having a common depth 1. The second and third processes share the same diversity of system calls (A, B, C, D) such that their patterns are determined by Pattern 1.2. However, the first process of the depth 1 has a different combination of OS events (A, B) compared to other processes in the same depth. When this difference in the diversity of OS events is bigger than a threshold, this process is determined to have a slightly different pattern, such as Pattern 1.1, from peers. Similarly the processes 44 having the depth 2 are categorized into three variations of Pattern 2.1, 2.2, and 2.3 depending on their OS event patterns respectively.

Figure 4:
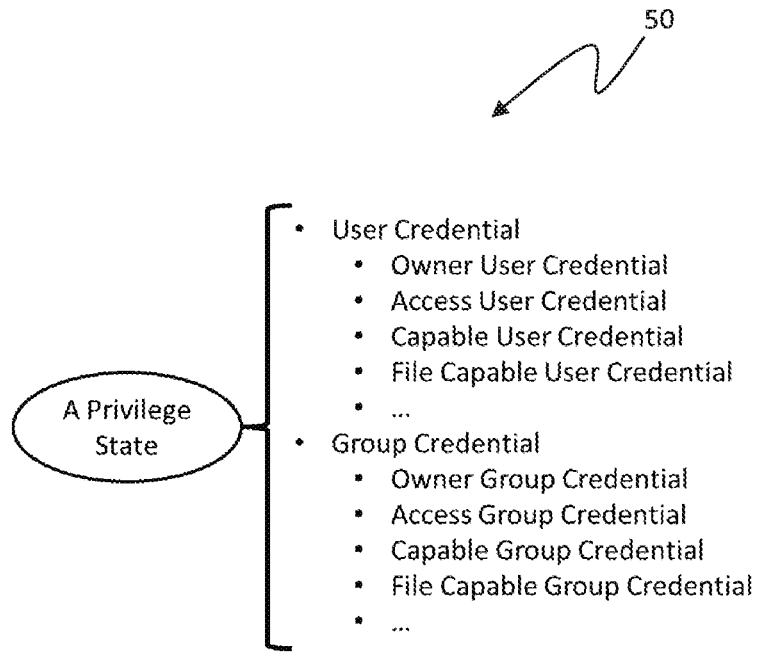
FIG. 4 is a block/flow diagram of a privilege state, in accordance with embodiments of the present invention.

FIG. 4 is a block/flow diagram of a privilege state 50, in accordance with embodiments of the present invention.

In order to analyze possible privilege transitions of programs, a new representation is proposed that is called a privilege flow graph (PFG). PFG is a graph that is composed of nodes and directed edges. A node represents a privilege state which includes multiple data fields of operating systems (OSs). FIG. 4 illustrates an example of such a privilege state.

Figure 5:
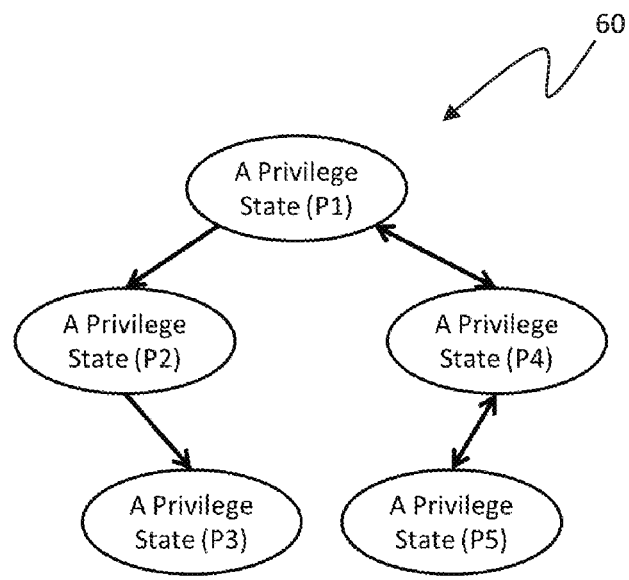
FIG. 5 is a block/flow diagram of a privilege flow graph, in accordance with embodiments of the present invention.

FIG. 5 is a block/flow diagram of a privilege flow graph 60, in accordance with embodiments of the present invention.

The edges show possible transitions across privilege states. For example, P1 can be changed to P2. P2 can be changed to P3. P1 and P4 can be changed into each other's state. P4 and P5 are the similar case.

Figure 6:
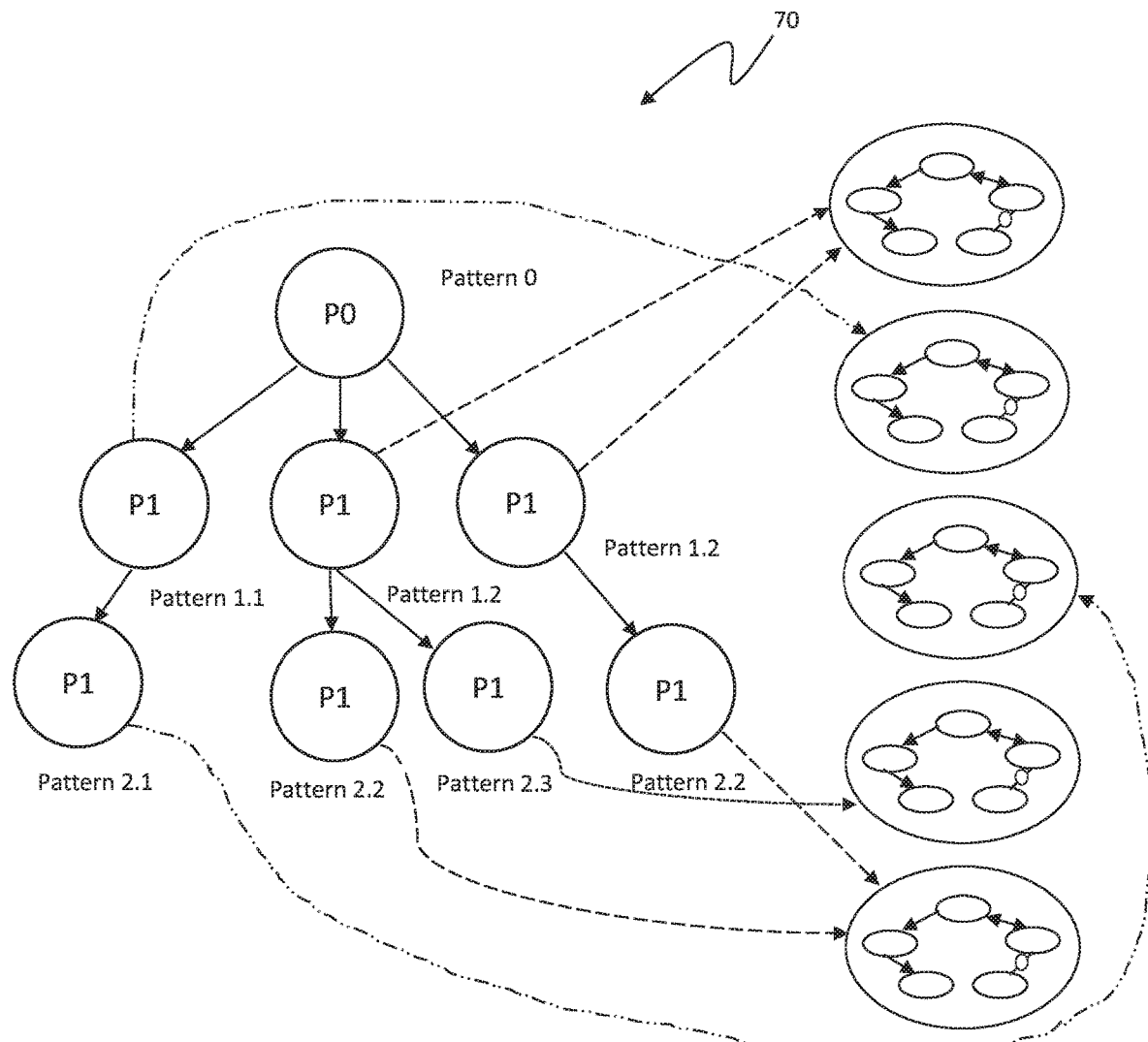
FIG. 6 is a block/flow diagram of an Inferred program behavior Context (IC)-aware privilege flow graph (PFG) for a program execution instance, in accordance with embodiments of the present invention.

FIG. 6 is a block/flow diagram of an IC-aware privilege flow graph (PFG) 70 for a program execution instance, in accordance with embodiments of the present invention.

For each process, its inferred program behavior context (IC) and the privilege flow graph (PFG) are derived. After that, the IC-aware privilege flow graph for the whole program is constructed using IC and PFGs. The left side of FIG. 6 shows the inferred process behavior context (IC). For each unique IC, its PFG is constructed. Note that the processes and/or threads sharing the same IC also share the PFG as well.

Figure 7:
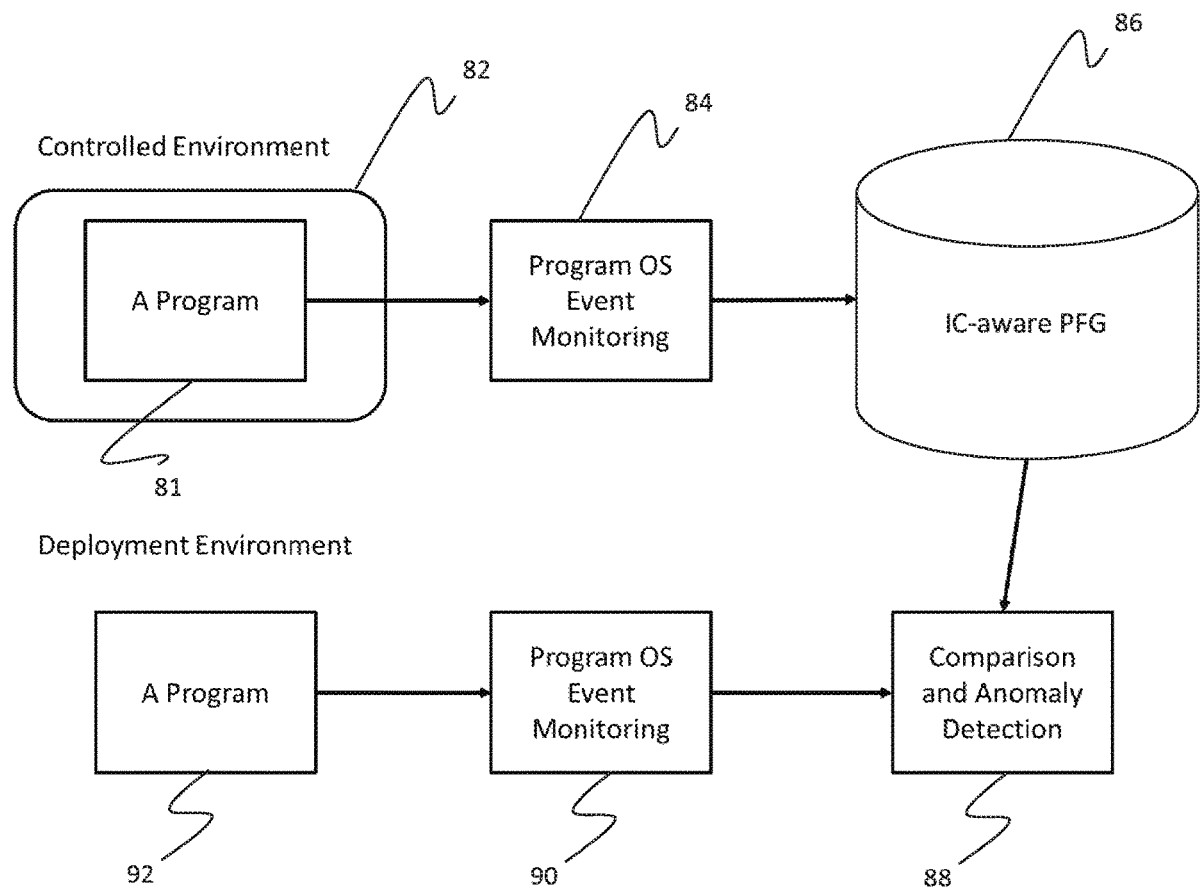
FIG. 7 is a block/flow diagram of anomaly detection using IC-aware PFG, in accordance with embodiments of the present invention.

FIG. 7 is a block/flow diagram of anomaly detection using IC-aware PFG, in accordance with embodiments of the present invention.

A controlled environment 82 includes a program 81. The program 81 is monitored by a program OS event monitoring module 84 and then fed to the IC-aware PFG 86. Subsequently, anomaly detection is performed by the comparison and anomaly detection module 88. Additionally, a deployment environment can include a program 92, which is monitored by a program OS event monitoring module 90, and fed into the comparison and anomaly detection module 88.

In order to perform anomaly detection, an IC-aware PFG needs to be constructed for a benign execution of a program. A workload similar to the actual deployment is used, but the program is run in a safe controlled environment. Then the IC-aware PFG can be kept as a file for the anomaly detection at the deployment time, as shown in FIG. 7.

For the anomaly detection, a program is deployed with the monitoring software and the IC-aware PFG constructed in the privilege flow model construction module 20. At runtime, a live IC-aware PFG is constructed and it is compared to the IC-aware PFG from the privilege flow model construction module 20 (FIG. 1). If any significant difference is detected, it is reported as an anomaly by the privilege flow anomaly detection module 22 (FIG. 1).

Figure 8:
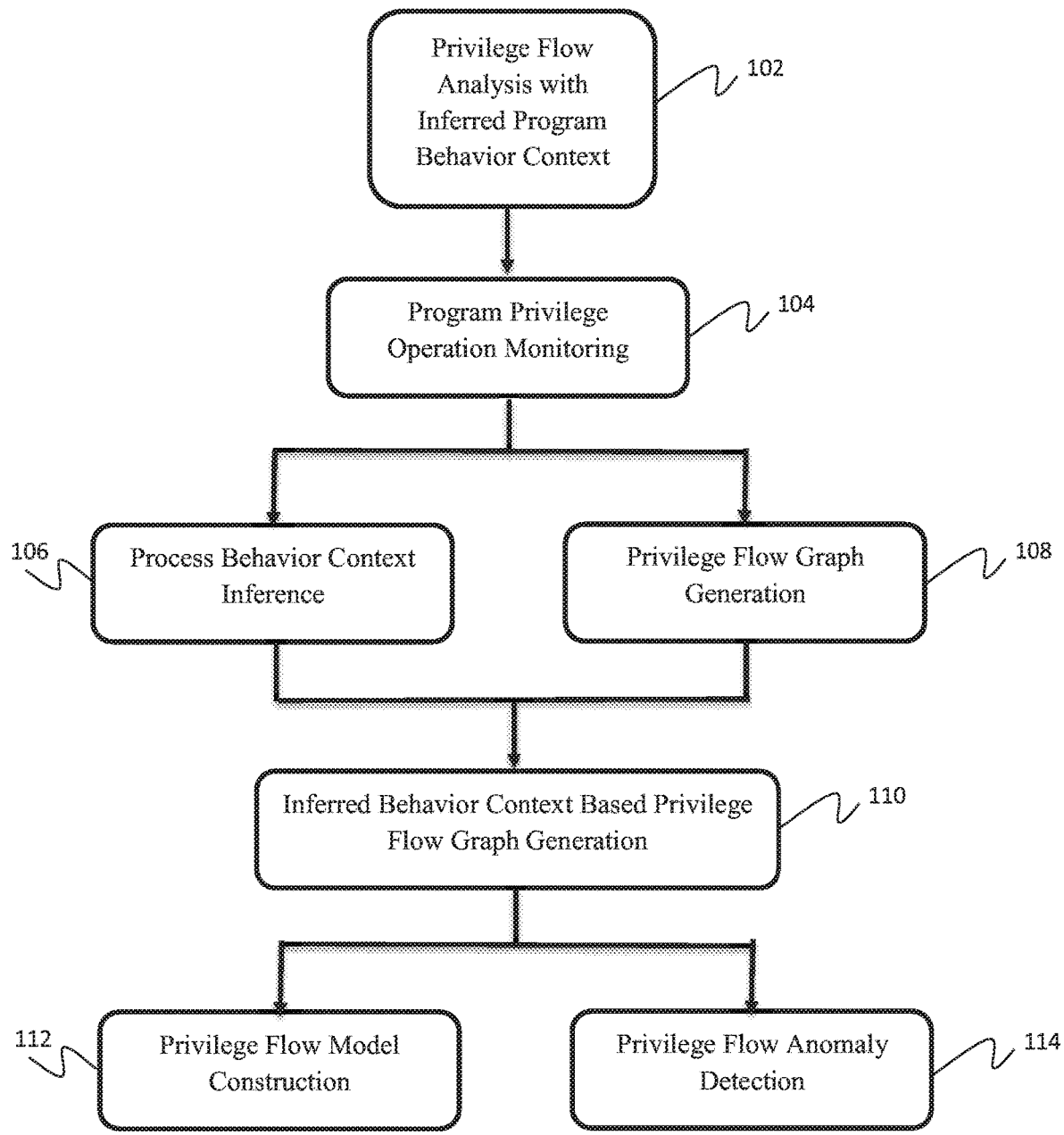
FIG. 8 is a block/flow diagram of a method for privilege flow analysis with inferred program behavior context, in accordance with embodiments of the present invention.

FIG. 8 is a block/flow diagram of a method for privilege flow analysis with inferred program behavior context, in accordance with embodiments of the present invention.

At block 102, a privilege flow analysis is performed with inferred program behavior context.

At block 104, program privilege operation monitoring is performed.

At block 106, process behavior context inference is executed.

At block 108, a privilege flow graph is generated.

At block 110, inferred behavior context based privilege flow graph generation is performed.

At block 112, a privilege flow model is constructed.

At block 114, a privilege flow anomaly is detected.

In summary, the exemplary embodiments of the present invention differentiate different roles of processes and/or threads. Stated differently, improved privilege state analysis is achieved with the awareness of different behaviors of the process and/or thread. Also, applying the behavior patterns of the behavior and privilege events to enable proactive monitoring of process deviations or differences illustrates how the data is applied to improve the computing environment.

Figure 9:
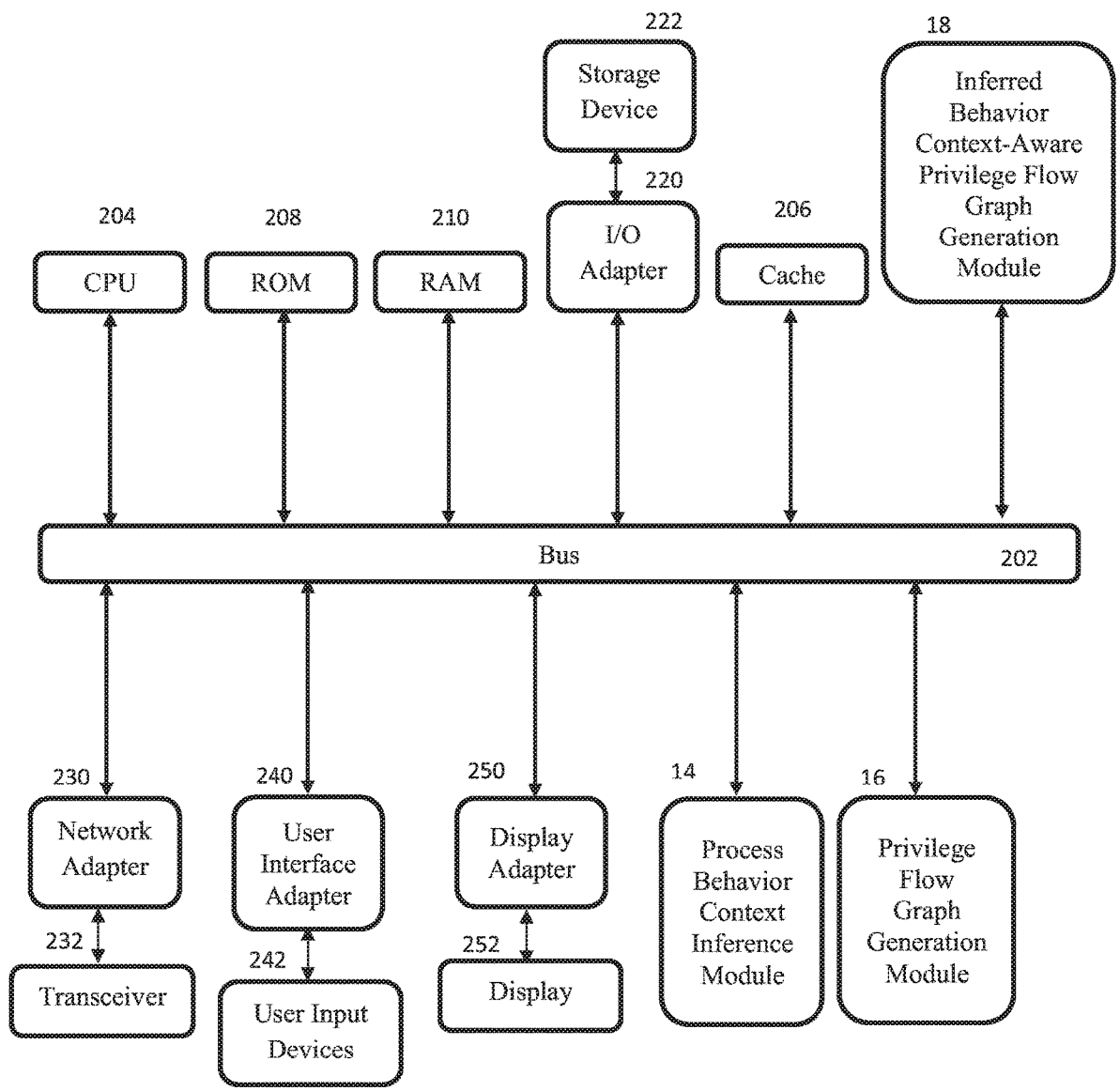
FIG. 9 is an exemplary privilege flow analysis processing system, in accordance with embodiments of the present invention.

FIG. 9 is an exemplary privilege flow analysis processing system, in accordance with embodiments of the present invention.

The processing system includes at least one processor (CPU) 204 operatively coupled to other components via a system bus 202. A cache 206, a Read Only Memory (ROM) 208, a Random Access Memory (RAM) 210, an input/output (I/O) adapter 220, a network adapter 230, a user interface adapter 240, and a display adapter 250, are operatively coupled to the system bus 202. Additionally, a process behavior context inference module 14, a privilege flow graph generation module 16, and an inferred behavior context-aware privilege flow graph generation module 18 are operatively coupled to the system bus 202.

A storage device 222 is operatively coupled to system bus 202 by the I/O adapter 220. The storage device 222 can be any of a disk storage device (e.g., a magnetic or optical disk storage device), a solid state magnetic device, and so forth.

A transceiver 232 is operatively coupled to system bus 202 by network adapter 230.

User input devices 242 are operatively coupled to system bus 202 by user interface adapter 240. The user input devices 242 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 242 can be the same type of user input device or different types of user input devices. The user input devices 242 are used to input and output information to and from the privilege flow analysis processing system.

A display device 252 is operatively coupled to system bus 202 by display adapter 250.

Of course, the privilege flow analysis processing system may also include other elements (not shown), as readily contemplated by one of skill in the art, as well as omit certain elements. For example, various other input devices and/or output devices can be included in privilege flow analysis processing system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the privilege flow analysis processing system are readily contemplated by one of ordinary skill in the art given the teachings of the present invention provided herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A non-transitory computer-readable storage medium comprising a computer-readable program for performing privilege flow analysis, wherein the computer-readable program when executed on a computer causes the computer to perform the steps of:

monitoring at least one program operating system (OS) event handled by a program;

generating a privilege flow graph of the program;

determining an inferred program behavior context of the program; and generating, based on a combination of the privilege flow graph and the inferred program behavior context, an inferred behavior context-aware privilege flow graph of the program to distinguish different roles of processes and/or threads within the program;

wherein the privilege flow graph is a state transition diagram of privileges of the program in terms of multiple OS data fields related to the privileges and summarizes transitions of privileges which the program may repeat;

wherein the inferred program behavior context is an inferred identity of the processes and/or thread of the program based on behavior patterns;

wherein the inferred program behavior context distinguishes different behavior characteristics and roles within the program;

wherein the behavior characteristics and roles are distinguished based on a program hierarchy level and system call characteristics; and wherein, if the program detects a privilege behavior outside of the inferred behavior context-aware privilege flow graph, such privilege behavior is labeled as an anomaly, and if the privilege behavior is not outside of the inferred behavior context-aware privilege flow graph, such privilege behavior is not labeled as an anomaly.

\* \* \* \* \*